United States Patent
Hernandez et al.

(10) Patent No.: US 6,208,977 B1
(45) Date of Patent: Mar. 27, 2001

(54) ACCOUNTING AND BILLING BASED ON NETWORK USE

(75) Inventors: Milton B. Hernandez, River Edge, NJ (US); Dmitry Kusnetsov, Brooklyn, NY (US); Pablo E. Tapia, Maywood, NJ (US)

(73) Assignee: Apogee Networks, Inc., Rochelle Park, NJ (US)

( * ) Notice: Subject to any disclaimer, the term of this patent is extended or adjusted under 35 U.S.C. 154(b) by 0 days.

(21) Appl. No.: 09/394,004

(22) Filed: Sep. 10, 1999

Related U.S. Application Data

(60) Provisional application No. 60/111,008, filed on Dec. 4, 1998.

(51) Int. Cl.[7] .................................................. G06F 15/60
(52) U.S. Cl. ............................. 705/34; 705/30; 705/400
(58) Field of Search .............................. 377/13, 14, 15, 377/16; 379/100.04, 111, 114; 705/30, 34, 400, 418

(56) References Cited

U.S. PATENT DOCUMENTS

| | | | |
|---|---|---|---|
| 5,163,042 | * 11/1992 | Ochiai | 370/238 |
| 5,315,592 | * 5/1994 | Conant et al. | 370/401 |
| 5,602,907 | 2/1997 | Hata et al. | 379/114 |
| 5,710,884 | * 1/1998 | Dedrick | 709/217 |
| 5,754,787 | * 5/1998 | Dedrick | 709/228 |
| 5,828,737 | * 10/1998 | Sawyer | 379/114 |
| 5,832,069 | * 11/1998 | Waters et al. | 379/115 |
| 5,854,899 | * 12/1998 | Callon et al. | 709/238 |
| 5,909,238 | * 6/1999 | Nagashima et al. | 348/3 |
| 5,970,050 | * 10/1999 | Johnson | 370/238 |
| 6,005,926 | * 12/1999 | Mashinsky | 379/114 |
| 6,034,946 | * 3/2000 | Roginsky et al. | 370/238 |
| 6,081,517 | * 6/2000 | Liu et al. | 370/352 |

FOREIGN PATENT DOCUMENTS

| | | | |
|---|---|---|---|
| 0751662 A2 | * 1/1997 | (EP) . | |
| 0883275 A2 | * 12/1998 | (EP) . | |
| 4-1015550 | * 4/1992 | (JP) | 379/243 X |
| 10-257465 | 9/1998 | (JP) . | |

OTHER PUBLICATIONS

"Method of Providing Rate Information for Multiple Networks": IBM Technical Disclosure Bulletin; Nov. 1, 1994, vol. 37, No. 11, pp. 551–552.*

Kay: For many on–line database users, time is money. (Focus on On–Line Databases); PC Week, Mar. 29, 1988, v5, n13, pp. 120–122.*

"The Meter is Running—As network costs add up, managers wonder who should foot the bandwidth bill"; Communications Week, Sep. 23, 1996, p. 50.*

* cited by examiner

Primary Examiner—Edward R. Cosimano
(74) Attorney, Agent, or Firm—Fish & Richardson P.C.

(57) ABSTRACT

A method and a system determines billing information for use of a network. For a data transmission on a path between a pair of node locations, the price for the transmission depends, inter alia, on the amount of data transported and the price of using the path. The method collects traffic data for data transmissions sent over links of the network, selects a set of paths connecting each pair of node locations, and determines a price for data transported between the pairs. The method bills an allocated portion of the total price for each pair to each node location of the pair.

30 Claims, 10 Drawing Sheets

62 → $P_{VP} = \sum_{\substack{\text{LINKS IN} \\ \text{VIRTUAL PATH}}} C_\ell / B_{VP}$ 59 → $B_{\ell_1 + \ell_2} = \text{MIN}\{B_1, B_2\}$ FOR SERIES LINKS $\ell_1, \ell_2$ 60 → $B_{\ell_1 + \ell_2} = B_1 + B_2$ FOR PARALLEL LINKS $\ell_1, \ell_2$ 61 → $C_{\ell_1 + \ell_2} = C_{\ell_1} + C_{\ell_2}$

FIG. 3A

|   | PRICE RESPONSE LEVEL | | | | | | |
|---|---|---|---|---|---|---|---|
|   |   | A' | B' | C' | D' | E' | F' |
|   | A | — | z' | y' | w' | t' | p' |
|   | B | z | — | x' | v' | s' | o' |
|   | C | y | x | — | u' | r' | n' |
|   | D | w | v | u | — | q' | m' |
|   | E | t | s | r | q | — | k' |
|   | F | p | o | n | m | k | — |

FIG. 5

ACCOUNTING AND BILLING BASED ON NETWORK USE

This application claims the benefit of U.S. Provisional Application No. 60/111,008, filed Dec. 4, 1998.

BACKGROUND OF THE INVENTION

This invention relates generally to network control and management and, more particularly, to billing network usage.

Presently, wide area networks (WAN's) have achieved an enormous popularity. The popularity of WAN's is, at least, partially due to their ability interconnect operations globally and to perform a variety of functions rapidly and economically. The functions performed by WAN's include data transport; for example, text, audio, and video data; message transport; conferencing; and searches of data bases. Each of these functions can require the transport of large amounts of data across the network. The transport of large amounts of data can use significant WAN bandwidth.

Users also employ WAN's for the distribution of data to groups of other users. One type of distribution is advertising where a large group of users will receive the distributed data. A second type of distribution is network conferencing, for example, video conferencing, which targets a well-defined and smaller group. A third type of distribution is electronic mail directed to a group of recipients, for example, the employees of a company. Distributions may require transmission of large amounts of data either because they target large groups or because they use data-intensive applications, such as, video or multimedia applications. The popularity of WAN's for the distribution of large data files has caused serious problems with maintaining sufficient WAN bandwidth particularly due to the proliferation of the Internet and ecommerce applications.

The convenience and usefulness of WAN's has produced an uncontrolled increase in bandwidth usage by individual users. This increase has substantially increased the cost of WAN's to businesses relying on them. The uncontrolled increase in bandwidth usage has given businesses two choices. Either accept anything and everything done by employee-users including the need to pay more and more for WAN services or restrict many WAN services from employ-users to control costs. Presently, businesses are unable to control bandwidth usage by employee-users without strongly limiting access to many convenient WAN features.

The increases in bandwidth usage have also resulted from undisciplined methods in the development of new applications that use WAN's.

The present invention is directed to overcoming, or, at least, reducing the effects of one or more of the problems set forth above.

SUMMARY

In a first aspect, the invention provides a method of billing users according to their use of a network. The network has a plurality of links interconnecting a plurality of node locations. The method includes determining a usage price per unit bandwidth for a virtual path between first and second node locations, collecting traffic data for an amount of data transported between the first and second node locations. The usage price is proportional to a sum of usage prices of links of a set of paths between the first and second node locations. The method also includes calculating a total price equal to the amount of data transported times the usage price per unit bandwidth.

In a second aspect, the invention provides a method of billing users according to their usage of a network. The network has a plurality of links interconnecting at least two node locations. The method includes determining a usage price per unit bandwidth for transmitting data between first and second node locations, collecting traffic data for the amount of data transported from the first node location to the second node location, and calculating a total price for the data transported. The total price is the usage price per unit bandwidth times the amount of data transported. The method also includes apportioning the total price between the first and second node locations according to either a price responsibility matrix or a rate plan.

In a third aspect, the invention also provides for a program storage device encoding an executable program. The program encodes instructions to perform one of the above-described methods of billing users according to their use of a network.

In a fourth aspect, the invention provides a system for billing users according to their use of a network. The network has a plurality of links interconnecting a plurality of nodes. At least two of the nodes have node locations. The system includes a plurality of collection units and a subsystem coupled to receive the data accumulated by the collection units. Each collection unit is coupled to a separate link of the network to accumulate traffic data on data transported over the coupled link and between pairs of nodes. The subsystem is adapted to determine a total price for data transported from a first to a second node location. The total price is the amount of data transported from first to the second node location times a usage price per unit bandwidth for a virtual path between the first and second node locations.

BRIEF DESCRIPTION OF THE DRAWINGS

Other objects, features, and advantages of the invention will be apparent from the following description taken together with the drawings in which:

FIG. 3A shows the set of equations regulating the construction of a virtual path between pairs of network node locations in FIG. 2;

FIG. 5 shows the form of the price responsibility level matrix PRL(S, D); and

DESCRIPTION OF THE PREFERRED EMBODIMENTS

The embodiments include methods and apparatus for accounting and billing the use of a WAN network to separate network node locations and/or users. Accordingly, the method and apparatus make users accountable for their usage levels thereby encouraging more efficient use of network resources.

Figure 1A:
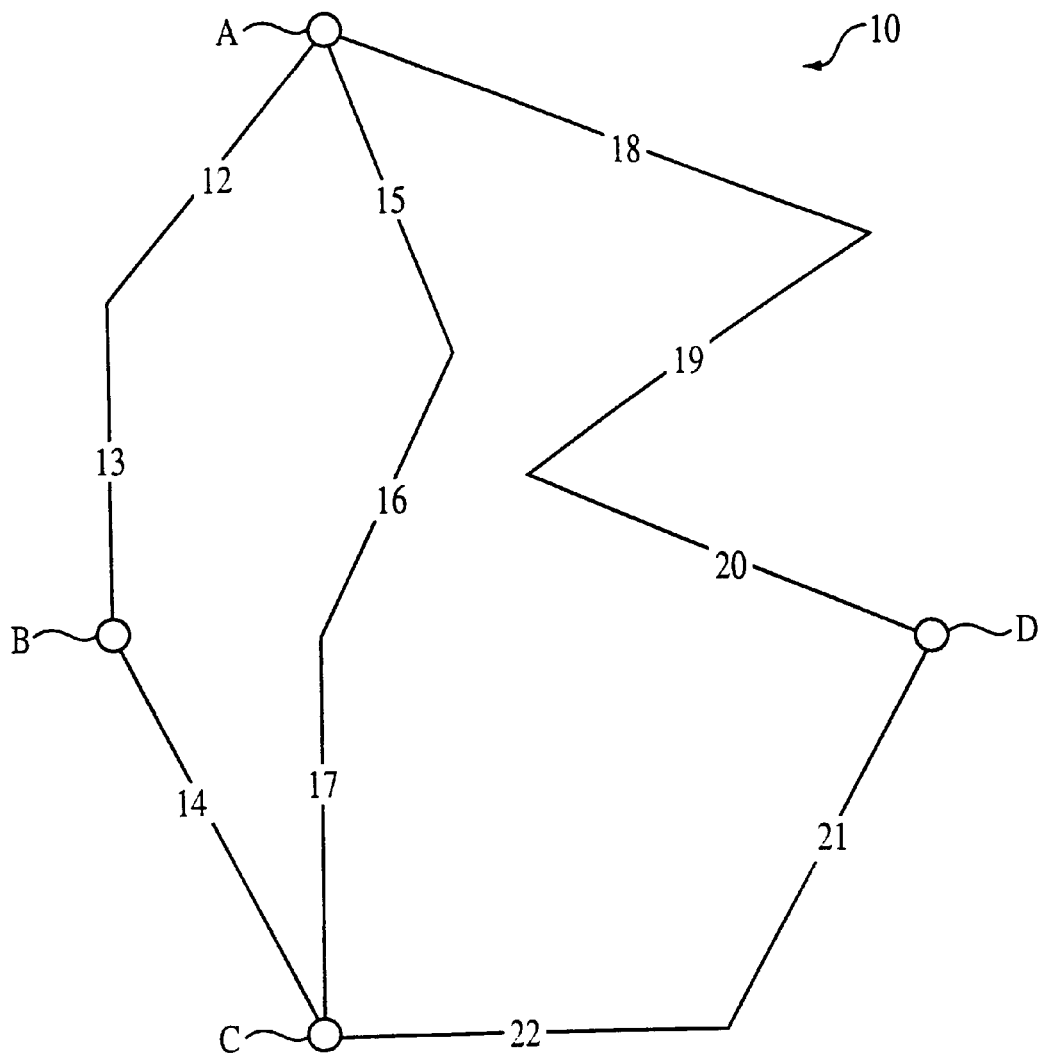
FIG. 1A shows a high-level diagram of an exemplary network.

FIG. 1A shows a network 10 having a plurality of links 12–22 and a plurality of network node locations A–D. The links 12–22 form paths, which connect the various network nodes locations A–D. Each link 1 has an associated usage price for using the full capacity of that link 1, $C_l$. Each link 1 also has a full available bandwidth $BF_l$, which is the maximum data rate through the link.

Herein, the usage price of a link 1 is defined to include costs and may include a desired profit. The costs include operating, hardware and/or maintenance costs of the link 1.

Several data paths will typically connect pairs of the network node locations A–D. For example, three paths formed from the respective sets of links 12–14, links 15–17, and links 18–22, connect the network node locations A, C. The paths connecting a pair of the node locations A–D may have different lengths, e.g., numbers of links, but each pair of node locations A–D has a set of shortest paths which have a minimum number of links 12–22. For the pair of node locations A, C, the paths formed by links 12–14 and by links 15–17 have three links and are the shortest paths connecting the node locations A and C. In the network 10, a path transmits data between its endpoints.

The exact form of the network 10 is inessential to the specific embodiments. The network 10 may have different topologies and function in different ways. The links 12–22 may use different types of hardware structures (not shown).

Figure 1B:
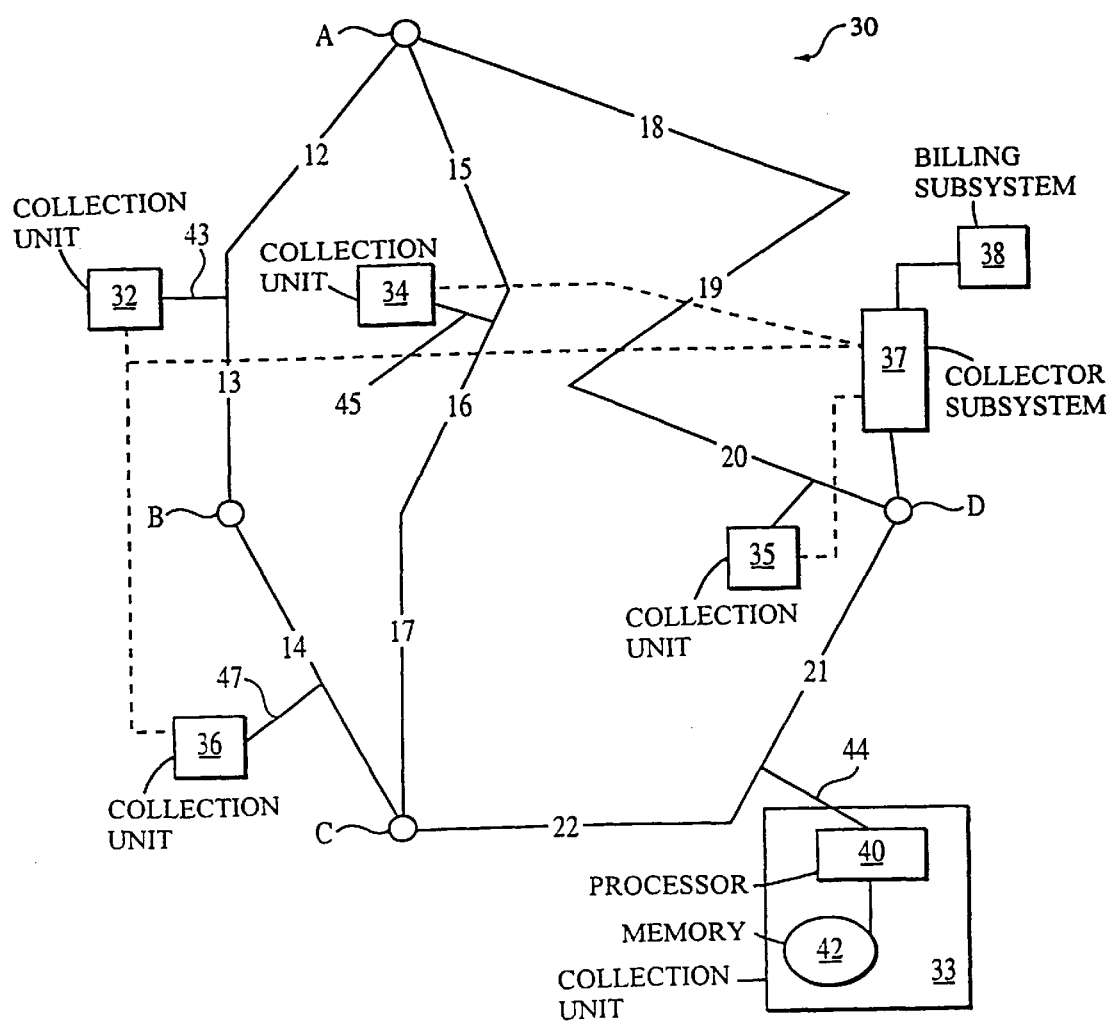
FIG. 1B shows a monitoring system for billing users of the network of FIG. 1A.

FIG. 1B illustrates a monitoring system 30 for determining billing data for usage of the network 10 of FIG. 1A. Some of the links 13, 21, 16, 20, 14 have an associated collecting unit 32–36, which accumulates traffic data for the associated link. The traffic data provides numbers of bytes of data that the associated link 13, 16, 20, 21, 14 transmitted between source and destination users during an accumulation period. The users may, for example, be applications on machines at particular network node locations A–D. The set of collection units 32–36 is sufficient to determine the data traffic over each path between a pair of network node locations A–D. From the traffic data over the links 12–22 associated with packet transmissions, one can determine the data traffic transmitted between each pair of the network node locations A–D.

The collection units 32–36 periodically send their accumulated traffic data to a collector subsystem 37, i.e., a designated computer having a network interface. The collector subsystem 37 uses the traffic data for two purposes. First, the data is used to determine the average utilization S of each link, which is the measured used bandwidth over a period of time divided by the full bandwidth. Herein, the used bandwidth is referred to as the nominal bandwidth. Second, the collection subsystem 37 uses the data to determine the prices for transmitting data in accordance with the invention.

In some embodiments, billing is performed by a separate billing subsystem 38. The billing subsystem 38 may perform a portion of the determination of the information used for billing. In such embodiments, the billing subsystem 38 receives data used for billing from one or more collector subsystems 37.

An interface 43–47 connects each collection unit 32–36 to one of the associated links 13, 21, 16, 20, 14. Each collection unit 32–36 is similar in construction and function. The collection units 32–36 may, for example, be real-time monitoring (RMON) probes.

The collecting unit 33 includes a processor 40 and a memory device 42. The processor 40 observes the associated link 21 and obtains traffic data that identifies the amount of data transported over the associated link 21 and the data's source and destination. The processor 40 writes accumulated traffic data to the memory device 42. Either, in response to cues from the collector subsystem 37 or automatically, at regular or specified time intervals, the processor 40 sends the accumulated traffic data from the memory device 42 to the collector subsystem 37.

The collecting subsystem 37 interacts with a group of collection units 32–36 to retrieve traffic data. The retrieved traffic data is processed by the collecting subsystem 37 to ensure data accuracy, eliminate duplication, and determine source and destination users. Using the processed data, the collection subsystem 37 generates detailed data on bandwidth usage for billing.

Figure 2A:
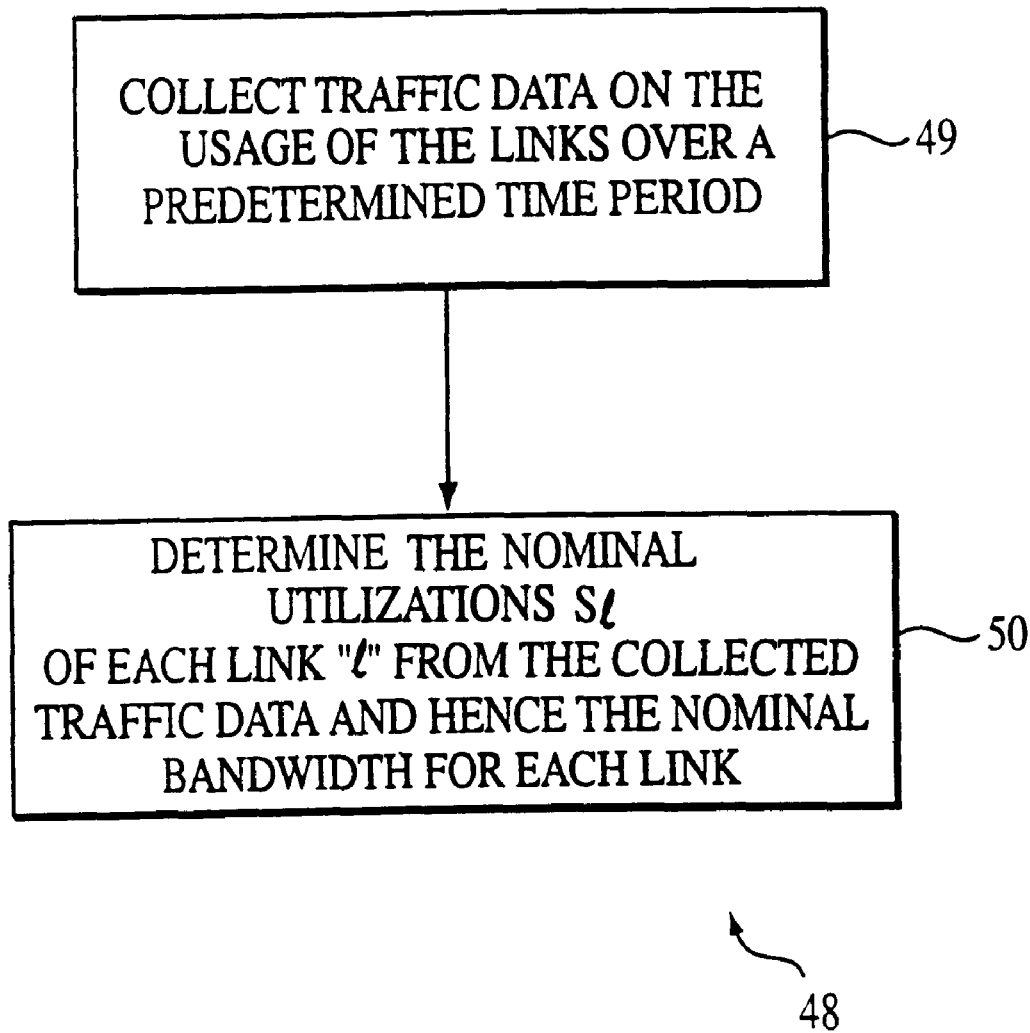
FIG. 2A is a high-level flow chart illustrating a method for determining the nominal usage of the links of the network of FIG. 1B.
Figure 2B:
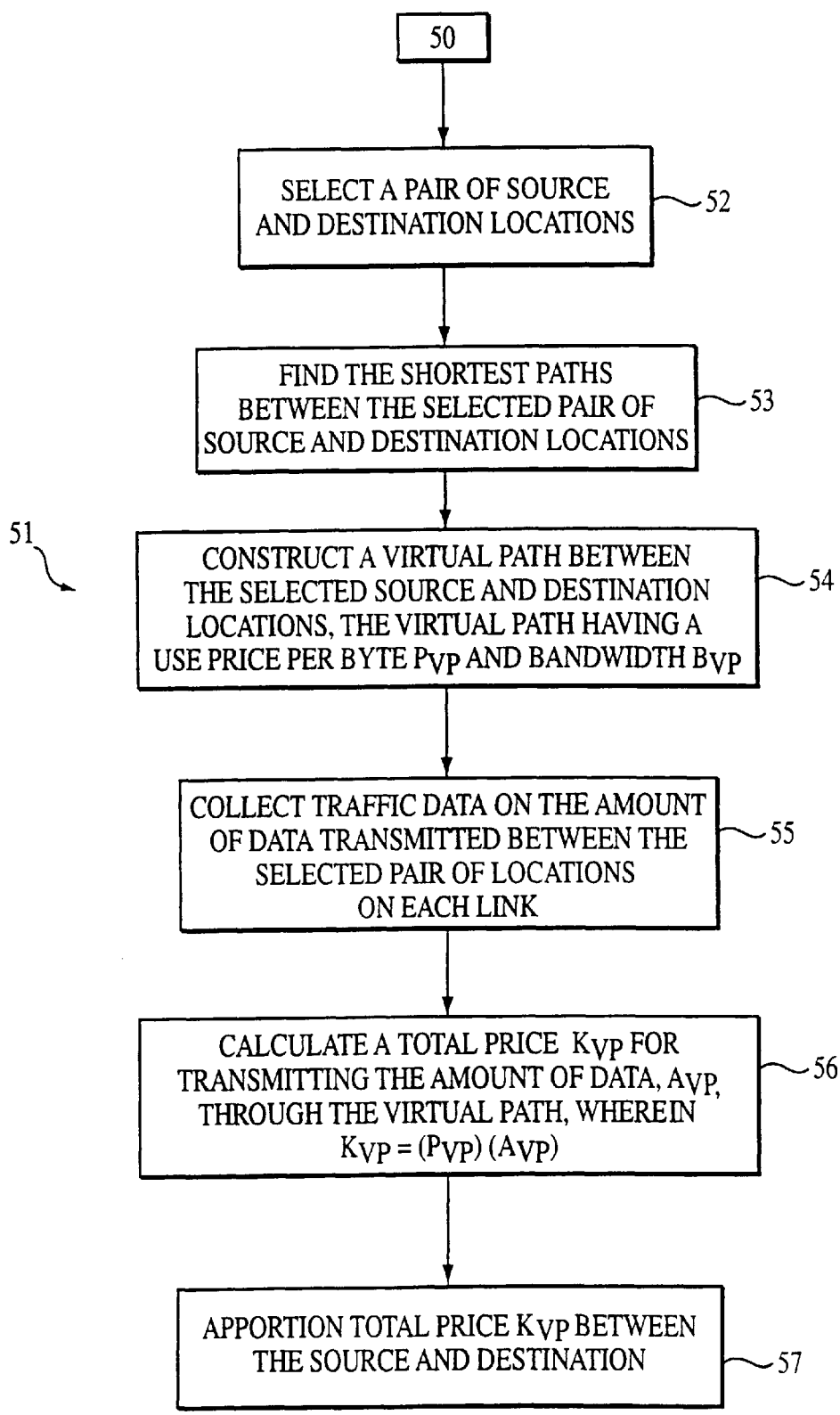
FIG. 2B is a high-level flow chart illustrating a method for billing users based on their network usage.

FIGS. 2A and 2B are high-level flow charts illustrating a method 48, 51 for billing users of the network 10 shown in FIG. 1B.

FIG. 2A is a high-level flow chart illustrating a method 48 for determining the nominal usage of the links 12–22 of the network 10 shown in FIG. 1B. At block 49, the collector subsystem 37 collects traffic data from the links 12–22 over a predetermined time period. The time period can be any period long enough to yield statistical average usage data, for example, a day, or month. At block 50, the collector subsystem 37 determines the nominal utilization $S_{12}$–$S_{22}$ of each link 12–22 from the collected traffic data. The nominal utilization of each link 12–22 is the percentage utilization of the full bandwidth of the link 12–22 averaged over the predetermined time period.

As noted above, the nominal utilization of each link 1 defines a nominal bandwidth $B_l$. $B_l$ equals $BF_lS_l$ where $BF_l$ is the full bandwidth of the link 1. Thus, the nominal bandwidth $B_l$ is a used bandwidth of the link 1 averaged over the predetermined time period of block 49 of FIG. 2A for all transmissions over the network. The embodiments employ the nominal link bandwidths to determine prices to charge users for transporting data communications between two endpoints. The prices include a portion for maintenance, operation, and infrastructure costs and a portion for desired profits.

FIG. 2B is a high-level flow chart illustrating a method 51 for determining prices to bill users at pairs of nodes for their usage of the network 10 shown in FIG. 1B. At block 52, the collector subsystem 37 selects a pair of source and destination node locations, for example nodes A, C. At block 53, the collector subsystem 37 finds the set of paths between the selected source and destination node locations A, C having the smallest number of links 12–22, i.e., the shortest paths. Referring to FIG. 1A, for the source and destination node locations A, C, the path formed of links 12–14 and the path formed of the links 15–17 have the smallest number of links. The collector subsystem 37 preferably employs the Dykstra algorithm, which is known to persons practiced in this field, to find the set of shortest paths. At block 54, the collector subsystem 37 constructs a virtual path from the set of shortest paths from block 52. A virtual path is a path defined by its two endpoints and a price per byte $P_{VP}$ for data transmitted between these endpoints. The collector subsystem 37 determines $P_{VP}$ for each virtual path from the properties of the links 12–22, as will be discussed below.

At block 55, the collecting units 32–36 collect traffic data on the amount data transmitted over the links 13, 21, 16, 20, 14 associated therewith. The traffic data gives the number of bytes transmitted on the associated link 13, 21, 16, 20, 14 as a function of source and destination node locations A–D. The collection units 32–36 accumulate the traffic data over a second predetermined period that is unrelated to the time period associated with block 49. The traffic data thus determines the amount of data transmitted over each link as a function of source and destination node locations.

From the traffic data, the collector subsystem 37 can determine the total amount of data passing between an ordered pair of node locations, $A_{VP}$. Thus, $A_{VP}$ is the sum of the data transported between each selected source and destination node locations, for example, A, C, over any links 12–22. One obtains $A_{VP}$ by summing the traffic over various links 12–22 without double counting traffic that has traveled over more than one link 12–22 having a collecting unit 32–36. The collecting units 32–36 provide enough routing data so that the collector subsystem 37 can avoid double counting the same communication even though several collecting units 32–36 have reported the same communication. In one embodiment, the location of the collecting units 32–36 with respect to the source and destination node locations provides the routing data used to avoid double counting.

At block 56, the collector subsystem 37 determines a total price for data sent between a selected pair of source and destination node locations $K_{VP}$ from the formula $K_{VP}=(P_{VP})(A_{VP})$. $P_{VP}$ will have already been determined, at block 54, as will be described below. At block 57, the collector or billing subsystem 37, 38 apportions the total price for data sent between the selected pair of node locations $K_{VP}$ between the selected pair of source and destination node locations A, C based on the location and/or user classes. The collector or billing subsystem 37, 38 produces billing information listing prices apportioned to each node location. In some cases, the portion of the total price $K_{VP}$ billed to an node location is 100% of $K_{VP}$. The total price $K_{VP}$ scales with the bandwidth used, i.e. with $A_{VP}$.

The collector or billing subsystem 38 produces billing information that apportions total prices to each node or user, e.g., a list of the total prices $K_{VP}$'s. The billing information is stored in a database for later use by an administrator who may actually make bills for nodes A–D or users.

FIG. 3A shows a system of equations 59–62, which enables an iterative determination of the properties of the virtual path at block 54 of FIG. 2. Equation 59 states that the nominal bandwidth $B_{l1+l2}$ of two links (or paths) $l_1$, $l_2$, connected in series, equals the minimum of the nominal bandwidths $B_{l1}$ $B_{l2}$ of the two links $l_1$, $l_2$. Equation 60 states that the nominal bandwidth $B_{l1+l2}$ for links (or paths) $l_1$, $l_2$, coupled in parallel, is the sum of the nominal bandwidths $B_{l1}$, $B_{l2}$ of the links $l_1$, $l_2$. Equation 61 states that the usage price $C_{l1+l2}$, of using two links (or paths) $l_1$, $l_2$, however connected, is the sum of the usage prices $C_{l1}$, $C_{l2}$ associated with each link (or path) $l_1$, $l_2$. Equation 62 states that the price $P_{VP}$ (in dollars per megabyte, for example), to use the virtual path is the sum of the usage prices $C_l$ for using the links l of the virtual path divided by the nominal bandwidth $B_{VP}$ of the virtual path. An iterative procedure determines the virtual path's nominal bandwidth $B_{VP}$. The procedure applies equations 59, 60 to the links of the shortest paths between the source and destination node locations as will be described below. Finally, Equations 59–62 enable one to determine the properties of the virtual path at block 54 of FIG. 2.

Figure 3B:
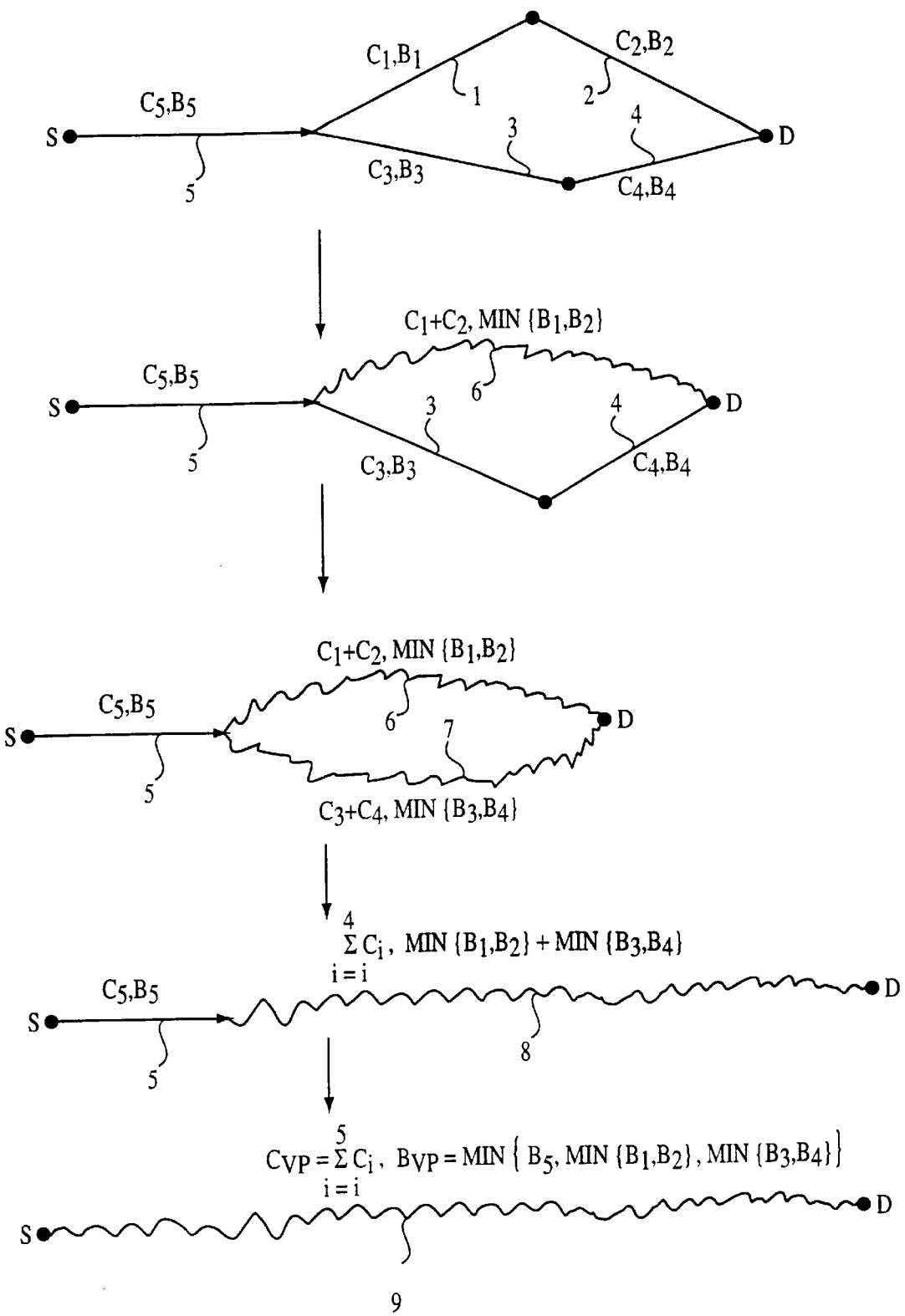
FIG. 3B shows the construction of a virtual path for a portion of a network having five links.

FIG. 3B illustrates the construction of the virtual path, at block 54 of FIG. 2. In the illustrated example, the set of shortest paths includes five links 1–5 between the source and destination node locations S, D. First, one combines links 1, 2 and uses equations 61, 59 of FIG. 3A to determine that the usage price $C_{l1+l2}$ and nominal bandwidth $B_{l1+l2}$ associated with the path 6 are $C_1+C_2$ and $\min\{B_1, B_2\}$, respectively. Next, one combines links 3, 4 to obtain that the usage price $C_{l3+l4}$ and nominal bandwidth $B_{l3+l4}$ associated with the path 7 are $C_3+C_4$ and $\min\{B_3, B_4\}$, respectively. Next, one combines the paths 6, 7 to obtain path 8 and the associated price and nominal bandwidth from equations 61, 60 of FIG. 3A. Finally, one combines link 5 and the path 8 to obtain the virtual path between node locations S and D and the associated values of usage price $C_{VP}$ and nominal bandwidth $B_{VP}$. Thus, the links $l_1$–$l_5$ are iteratively combined by repeatedly applying equations 59–61 until only one effective path remains. The remaining effective path is the virtual path. The nominal bandwidth and price of the remaining path are the nominal bandwidth $B_{VP}$ and usage price $C_{VP}$ of the virtual path represented by equations 9. The price per byte $P_{VP}$ allocated to sending data between the two nodes S and D is then the usage price $C_{VP}$ for using all links in the virtual path divided nominal bandwidth $B_{VP}$ of the virtual path.

The collector subsystem 37 employs the iterative procedure of FIG. 3B to determine the usage price $C_{VP}$ and nominal bandwidth $B_{VP}$ for the virtual path between the selected pair of node locations A, C at block 54 of FIG. 2B. The collector subsystem 37 only uses the known usage prices $C_{l2}$–$C_{22}$ and nominal bandwidths $B_{l2}$–$B_{22}$ of the links 12–22 to determine the price per byte $P_{VP}$ of the virtual path. However, the nominal bandwidths $B_{l2}$–$B_{22}$ are not known a priori, and initially, one enters the usage prices $C_{l2}$–$C_{22}$ and full bandwidths $BF_{l2}$–$BF_{22}$ of each link 12–22 into the collector subsystem 37. Then, the collector subsystem 37 determines the nominal bandwidths $B_{l2}$–$B_{22}$ by the method 48 of FIG. 2A and $P_{VP}$ for each node pair by the method 51 illustrated in FIGS. 2B, 3A, and 3B.

Figure 4A:
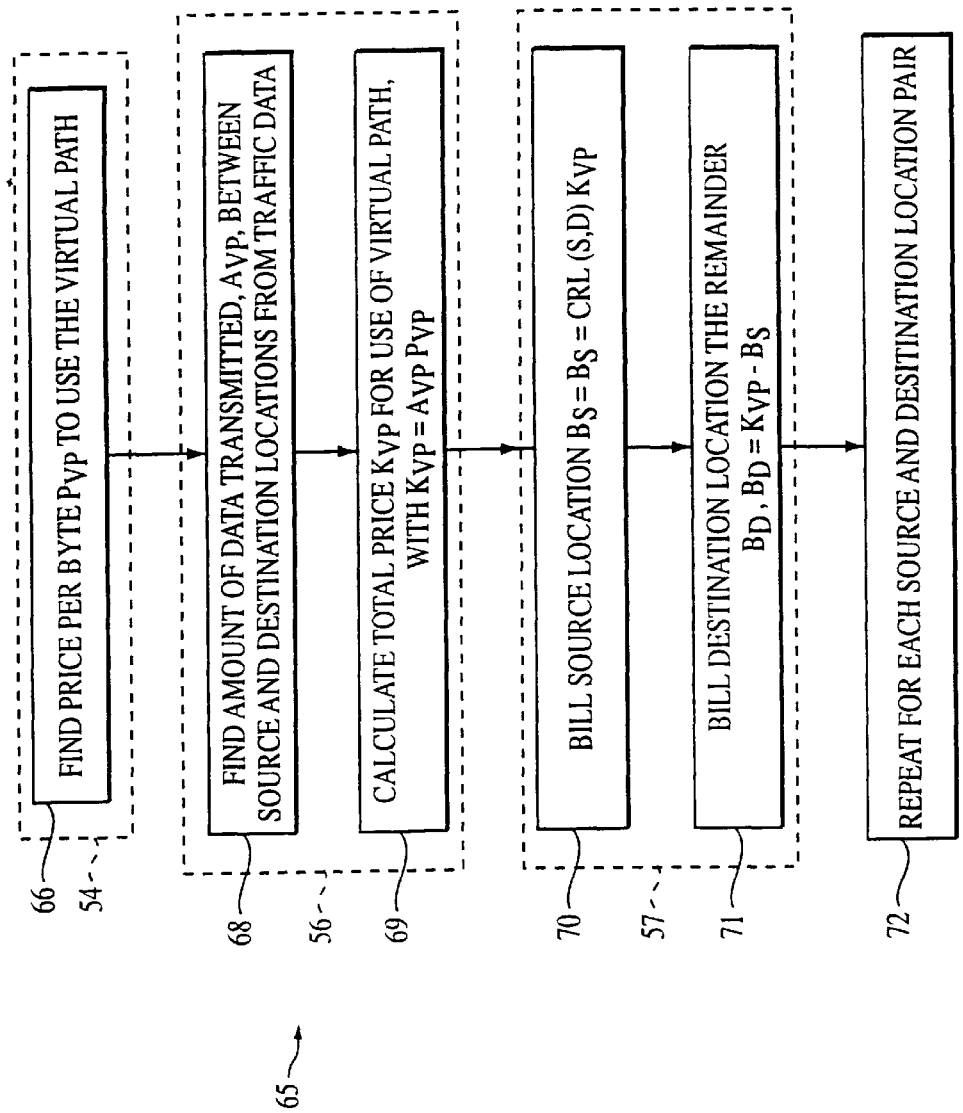
FIG. 4A shows the step of determining the total price and apportioning the total price in the method of FIG. 2B.

FIG. 4A is a flow chart 65 illustrating the steps of calculating the total price for data transmission between a selected pair of node locations $K_{VP}$ and how the system 37 or 38 apportions the total price $K_{VP}$ in FIG. 2B. At block 66, a sub-block of block 54 (see FIG. 2B), the collector subsystem 37 determines the price per byte $P_{VP}$ for sending data between the selected pair of node locations, for example nodes A, C. The collector subsystem 37 calculates $P_{VP}$ by the iterative construction of the virtual path (see FIG. 3B). At block 68, a sub-block 0f block 56 (see FIG. 2B), the collector subsystem 37 uses the traffic data from the collecting units 32–36 to calculate $A_{VP}$, i.e. the amount of data sent from a source node location to a destination node location. To find $A_{VP}$, the collector subsystem 37 sums the data traffic over the paths between the selected source and destination node locations without double counting. The collection units 32–36 provide information enabling the collector subsystem 37 to avoid double counting, i.e., counting the same traffic reported by more than one collection unit 32–36 twice.

In one embodiment, the collector subsystem 37 avoids double counting by accepting traffic data from a single selected collection unit 32–36 for each observed communication. The selected collection unit 32–36 is located adjacent the source location of the communication if a such collection unit 32–36 exists. Otherwise, the selected collection unit 32–36 is located adjacent the destination location for the communication. The collection units 32–36 provide information enabling the collector subsystem 37 to determine whether the units 32–36 are located adjacent the source or destination for a communication.

At block 69, a sub-block of block 56 (see FIG. 2B) the collector subsystem 37 determines the total price for sending data between a selected pair of source and destination $K_{VP}$ by multiplying the price per byte $P_{VP}$ for the pair by the amount of data transmitted. At block 70, a sub-block of block 57 (see FIG. 2B) the collector or billing subsystem 37, 38 bills a portion of the determined total price $K_{VP}$ to the source node location A of the selected pair. The portion is determined by a price responsibility level matrix (PRL) to be discussed below. At block 71, a sub-block 0f block 57 (see FIG. 2B) the collector or billing subsystem 37, 38 bills the remainder, if any, of the total price $K_{VP}$ to the destination node location C of the selected pair. At block 72, the collector or billing subsystem 37, 38 repeats the above steps to bill total prices for data transport between other selected pairs of source and destination locations $K_{VP}$.

The methods 48, 52, 65 of FIGS. 2A, 2B and 4A enable the entire desired revenue for use of the network 10, shown in FIG. 1B, to be apportioned among network users. Using the nominal bandwidth $B_l=BF_lS_l$ instead of the full bandwidth $BF_l$, for each link l, gives a total price $K_{VP}$, which takes into account the use of each link in the network. The sum of these total prices for data transport between all pairs of source and destination node locations $K_{VP}$ is equal to the entire desired revenue for use of the network. The nominal utilizations $S_{12}$–$S_{22}$ are automatically updated on a regular basis to account for temporal changes in the usage of the links 12–22 . An administrator can request that the collector and/or billing subsystems 37, 38 recalculate billing prices to track temporal changes in nominal utilizations $S_{l2}$–$S_{22}$.

The network administrators can also adjust the prices billed by changing the usage prices $C_{l2}$–$C_{22}$ of the individual links 12–22 to reflect, for example, upgrades, increased hardware costs, etc. The network administrator can also adjust all $P_{VP}$'s by the same or different multiplication factors to more accurately reflect the cost of the network or to build in a profit (or loss). This flexibility enables tracking variable costs for operating the links 12–22 of FIG. 1B.

Figure 4B:
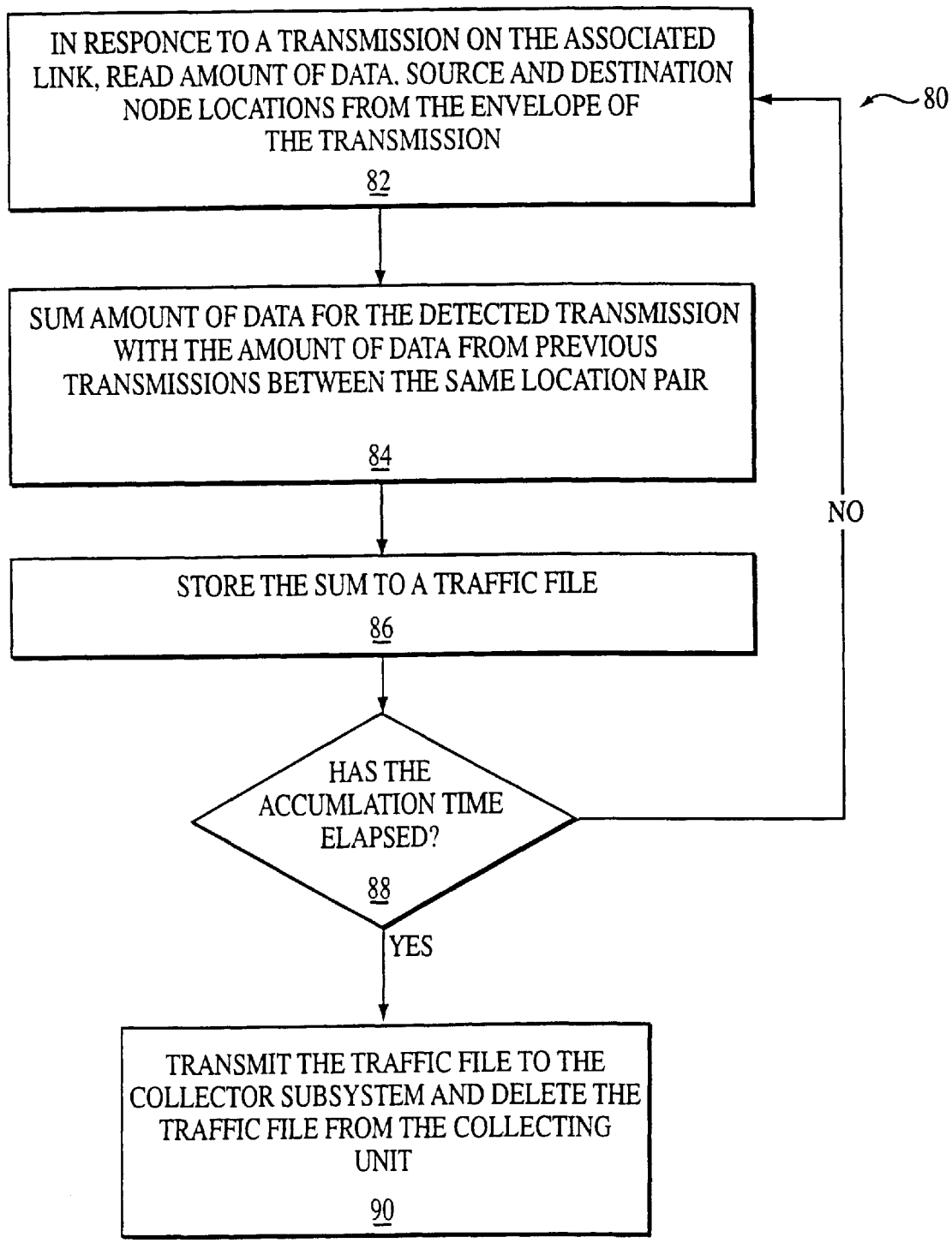
FIG. 4B is a flow chart for a method of collecting traffic data in a link's collection unit.

FIG. 4B illustrates a method 80 of collecting traffic data on the link 21 associated with the collection unit 33 of FIG. 1B. At block 82, the processor 40 determines the amount of data transmitted and the source and destination node locations for a detected data transmission on the associated link 21. The processor 40 obtains the above data by reading the envelope or header of the detected transmission. At block 84, the processor 40 sums the amount of data for the detected transmission with the amount of data from previous transmissions between the same node locations. At block 86, the processor 40 stores the sum in a traffic file in the memory device 42. The traffic file is a matrix whose entries are total numbers of bytes transmitted on the link 21. Source node locations label the columns of the matrix, and destination node locations label the rows of the matrix. At block 88, the processor 40 determines whether a preselected accumulation time has elapsed. At block 90, in response to the preselected accumulation time having elapsed, the collector subsystem 37 collects the traffic file from the processor 40 by a push or pull operation. Then, the processor 40 deletes the file. If the preselected accumulation time has not elapsed, the processor 40 returns to block 82.

During each accumulation period, all of the collection units 32–36 create traffic files listing the amount of-data transmitted between fixed pairs of users over the associated links 13, 21, 16, 20, 14.

At blocks 71 and 72 of FIG. 4A, rate plans or billing classes determine the apportionment of the total price for data transmission between pairs of source and destination node locations $K_{VP}$. A price responsibility level matrix PRL (S,D) implements the apportionment for billing classes.

Rate plans assign billing liability for the whole price for a data transmission to a user responsible for initiating the transmission. For example, the sender of electronic mail is responsible for sending the mail transmission and is billed the whole price for the mail. Similarly, the requestor of a download from a free network server is responsible for the download and is billed the whole price for transmitting the download from the data base. Heavier apportionments of usage prices to the user who initiated the network usage encourages efficient use of the network 10 by discouraging undisciplined usage of bandwidth.

Referring to FIG. 5, the PRL matrix 94 determines the percentage of the total price $K_{VP}$ charged to the source location A–F and destination location A'–F' of the pair associated with the $K_{VP}$. The columns 96 and rows 98 of the PLR matrix are labeled by the billing classes. The collector or billing subsystem 37, 38 is programmed with the values of the PLR matrix 94 so that the total price $K_{VP}$ is automatically apportioned between source and destination of the pair associated with the $K_{VP}$ The entries of PLR 94 give the portion of the total price $K_{VP}$ billed to the associated source A–F. For example, for the source/destination pair A/B', (z') $K_{VP}$ is billed to source A and (1–z') $K_{VP}$ is billed to associated destination B'.

Some embodiments of the invention have first, second, and third billing classes of node locations. The first class includes node locations for network managing devices, e.g., the collector subsystem 37. The second class includes node locations for data base servers, which respond to data download requests from general network users. The third class includes general network users. In addition, some embodiments include finer classes, such as, two types of general user classes. The class designations of the different embodiments encourage different user types to more efficiently use the network 10.

The PRL matrix may take on a range of values to encourage various classes of users to be more efficient.

The price response level matrix may be modified with time to account for changes in costs of maintaining the network 10 and monitoring configuration 30 of FIGS. 1A and 1B. The modifications may produce a net profit or net break-even relationship between billings for network usage and network maintenance costs. The modifications may be automatic and triggered by a net loss or break-even relationship between billings and maintenance costs. Such automatic modifications may be performed by the collector or billing subsystem 37, 38 of FIG. 1B.

Figure 6:
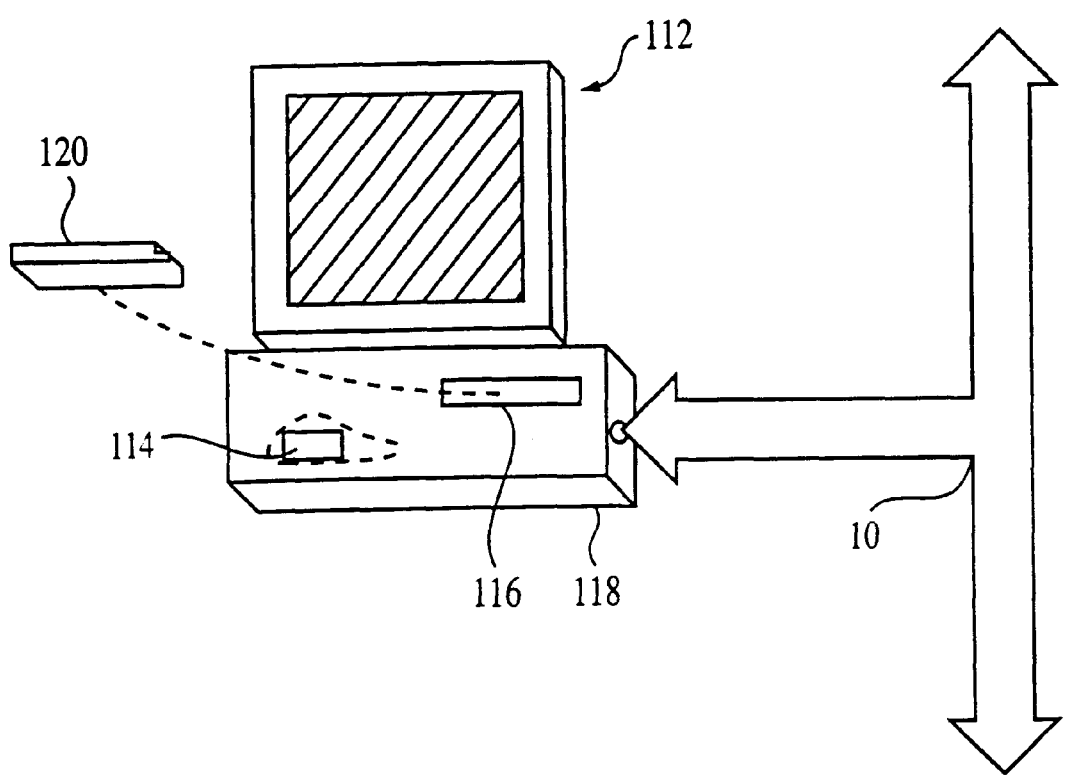
FIG. 6 shows a collector subsystem programmed to perform the methods of FIGS. 2 and 4.

FIG. 6 shows the an embodiment 112 of the collector subsystem 37 of FIG. 1B. The computer has a main active memory 114 and a drive 116. An interface 118 connects the computer 112 to the network 10. A program storage device 120 is readably positioned in the drive 116. The program storage device 120 can be a magnetic tape or disk, an optical disk or another readable program storage device. The program storage device 120 tangibly encodes a program having steps for performing the methods 48, 51, 65, and 80 of FIGS. 2A, 2B, 4, and 5, respectively. The drive 116 can read the program, and the program is in a form executable by the computer 112. The active memory 114 can also store the program.

Finally, the methods 48, 51 of FIGS. 2A and 2B enables the network manager a large flexibility in adjusting the price of using of the network 10. For example, the total price $K_{VP}$ could be discounted for use at off-peak periods, such as, certain times of the day and/or certain days of the week. Such changes only require discounting the total prices $K_{VP}$ by a percentage at off-peak times. Similarly, the system 30 of FIG. 1B could offer discounts to certain types of traffic. The network manager can also flexibly increase prices to penalize activities, which are more expensive to network 10, e.g., usage during peak hours. Finally, the flexibility offered by the PRL matrix enables the network manager to encourage economic use of the network 10 by various groups of users.

Additions, deletions, and other modifications of the described embodiments will be apparent to those practiced in this field and are within the scope of the following claims.

What is claimed is:

1. A method of billing users according to their usage of a network having a plurality of links interconnecting a plurality of node locations, comprising:
   determining a usage price per unit bandwidth for a virtual path between a first and second node locations, the usage price being proportional to a sum of usage prices of links of a set of paths between the first and second node locations;
   collecting traffic date for an amount of data transported between the first and second node locations;
   calculating a total price equal to the amount of data transported times the usage price per unit bandwidth; and
   transmitting a bill including the total price to each of the users.

2. The method of claim 1, wherein the act of apportioning includes using a price responsibility level matrix to determine the apportionment of the total price.

3. The method of claim 1, further comprising:
   determining nominal usage for each link, the bandwidth of a specific link being a full bandwidth of the specific link times the nominal usage of the specific link.

4. The method of claim 1, wherein the set comprises shortest paths of links between the first and second node locations.

5. The method of claim 4, wherein the act of collecting traffic data comprises:
   retrieving the traffic data from a set of collection units distributed in the network; and
   removing double counting of traffic from the received traffic data.

6. The method of claim 1, further comprising:
   determining an effective bandwidth of the virtual path, the usage price per unit bandwidth being the sum divided by the effective bandwidth.

7. The method of claim 6, wherein the effective bandwidth of the virtual path equals an equivalent bandwidth of a virtual link produced from the set of links by:
   replacing a serially connected pair of links of the set by a first new link having an equivalent bandwidth equal to a minimum of the bandwidths of the links replaced; and
   replacing a pair of links of the set connected in parallel by a second new link having an equivalent bandwidth equal to a sum of the bandwidths of the links replaced; and
   repeating said acts of replacing on remaining links of the set until one link remains, the one remaining link being the virtual link.

8. The method of claim 1, further comprising:
   apportioning the total price between the first and second locations.

9. The method of claim 8, wherein the act of apportioning includes:
   deciding which of the first or second node locations is responsible for initiating the data transport therebetween; and
   apportioning the total price to the responsible node address.

10. The method of claim 8, wherein the act of billing apportions unequal portions of the total price to the first and second node locations in response to the node locations belonging to different billing classes.

11. A method of billing users according to usage of a network, the network having a plurality of links interconnecting, at least, two node locations, comprising:
    determining a usage price per unit bandwidth for transmitting data between first and second node locations;
    collecting traffic data for the amount of data transported from the first node address to the second node location;
    calculating a total price for the data transported, the total price being the usage price per unit bandwidth times the amount of data transported;
    apportioning the total price between the first and second node locations according to one of a price responsibility matrix and a rate plan; and
    transmitting a bill, according to one of the price responsibility matrix and the rate plan, to each of the users, the bill including the apportioned total price.

12. The method of claim 11, wherein the act of apportioning includes:
    deciding which of the first or second node locations is responsible for initiating the data transport therebetween; and
    apportioning the total price to the responsible node location.

13. The method of claim 11, wherein the act of collecting traffic data comprises:
    receiving the traffic data from a set of collection units distributed in the network; and
    removing double counting of traffic from the received traffic data.

14. The method of claim 11, wherein the usage price per unit bandwidth is proportional to a sum of usage prices of a set of links of shortest paths between the first and second node locations.

15. The method of claim 14, further comprising:
    measuring nominal usage data for each link of the set; and
    defining the bandwidth of each specific link to be a full bandwidth of the specific link times the nominal usage of the specific link.

16. The method of claim 14, further comprising:
    determining an effective bandwidth of the virtual path, the usage price per unit bandwidth being the sum divided by the effective bandwidth.

17. The method of claim 16, wherein the effective bandwidth of the virtual path equals an equivalent bandwidth of a virtual link produced from the set of links by:
    replacing a serially connected pair of links of the set by a first new link having an equivalent bandwidth equal to a minimum of the bandwidths of the links replaced; and
    replacing a pair of links of the set connected in parallel by a second new link having an equivalent bandwidth equal to a sum of the bandwidths of the links replaced; and
    repeating said acts of replacing on remaining links of the set until one link remains, the one remaining link being the virtual link.

18. A system for billing use of a network having a plurality of links interconnecting nodes of the network, at least two of said node having node locations, comprising:

a plurality of collection units, each collection unit coupled to a separate link of the network and adapted to accumulate traffic data on the amount of data transported over the coupled link between pairs of node locations; and a subsystem coupled to receive the data accumulated by the collections units and adapted to determine a total price for data transported from a first to a second node location, the total price being the amount of data transported from the first to the second node location times a usage price for a virtual path between said first and second node locations, the subsystem further adapted to transmit a bill, which includes the total price, to each of the users.

19. The system of claim 18, wherein the subsystem is adapted to produce billing information for a particular node location based on the total prices for data transported from the particular node location to other node locations.

20. The system of claim 19, wherein the subsystem is adapted to apportion the total prices between the first and second node locations of each pair based on billing classes of the node locations.

21. An article comprising a computer-readable medium which stores computer-executable instructions for a method of billing users according to their usage of a network, the network having a plurality of links interconnecting a plurality of node locations, the instructions causing a computer to:

determine a usage price per unit bandwidth for a virtual path between a first and second node locations, the usage price being proportional to a sum of usage prices of links of a set of paths between the first and second node locations;

collect traffic date for an amount of data transported between the first and second node locations;

calculate a total price equal to the amount of data transported times the usage price per unit bandwidth; and transmit a bill including the total price to each of the users.

22. The device of claim 21, wherein the act of apportioning includes using a price response matrix to determine the apportionment of the total usage.

23. The device of claim 21, the method further comprising:

determining nominal usage for each link, the bandwidth of a specific link being a full bandwidth of the specific link times the nominal usage of the specific link.

24. The device of claim 21, wherein the set comprises shortest paths of links between the first and second node locations.

25. The device of claim 24, wherein the act of collecting traffic data comprises:

receiving the traffic data from a set of collection units distributed in the network; and removing double counting of traffic from the received traffic data.

26. The device of claim 21, the method further comprising:

determining an effective bandwidth of the virtual path, the usage price per unit bandwidth being the sum divided by the effective bandwidth.

27. The device of claim 26, wherein the effective bandwidth of the virtual path equals an equivalent bandwidth of a virtual link produced from the set of links by:

replacing a serially connected pair of links of the set by a first new link having an equivalent bandwidth equal to a minimum of the bandwidths of the links replaced; and replacing a pair of links of the set connected in parallel by a second new link having an equivalent bandwidth equal to a sum of the bandwidths of the links replaced; and repeating said acts of replacing on remaining links of the set until one link remains, the one remaining link being the virtual link.

28. The device of claim 21, the method further comprising:

apportioning the total price between the first and second locations.

29. The device of claim 28, wherein the act of billing apportions unequal portions of the total price to the first and second node locations in response to the node locations belonging to different billing classes.

30. The device of claim 28, wherein the act of apportioning includes:

deciding which of the first or second node locations is responsible for initiating the data transport therebetween; and apportioning the total price to the responsible node location.

* * * * *